United States Patent [19]

Boy et al.

[11] Patent Number: 5,564,735
[45] Date of Patent: Oct. 15, 1996

[54] SIDE MOUNTED AIRBAG DEVICE

[75] Inventors: Hans-Joachim Boy, Gifhorn; Stefan Matuschek, Wolfsburg, both of Germany

[73] Assignee: Volkswagen AG, Wolfsburg, Germany

[21] Appl. No.: 438,884

[22] Filed: May 10, 1995

[30] Foreign Application Priority Data

May 21, 1994 [DE] Germany ............... 44 17 902.2

[51] Int. Cl.⁶ .................................................. B60R 21/22
[52] U.S. Cl. ................................................ 280/730.2
[58] Field of Search .................. 280/728.1, 730.1, 280/730.2; 297/410, 216.12, 216.1

[56] References Cited

U.S. PATENT DOCUMENTS

| | | | |
|---|---|---|---|
| 3,945,665 | 3/1976 | Tsutsumi et al. | 280/731 |
| 4,946,191 | 8/1990 | Putsch | 280/730.2 |
| 5,282,667 | 2/1994 | Elton et al. | 297/410 |
| 5,348,342 | 9/1994 | Haland et al. | 280/730.2 |
| 5,431,435 | 7/1995 | Wilson | 280/728.1 |

FOREIGN PATENT DOCUMENTS

| | | |
|---|---|---|
| 4204280 | 8/1992 | Germany. |
| 92027253 | 9/1992 | Germany. |
| 4210562 | 10/1992 | Germany. |
| 91112060 | 2/1993 | Germany. |

*Primary Examiner*—Karin L. Tyson
*Attorney, Agent, or Firm*—Brumbaugh, Graves, Donohue & Raymond

[57] ABSTRACT

A safety arrangement for a vehicle includes a gas cushion arranged for the protection of a passenger in a back seat in the event of a side collision. In order to protect the hip and chest regions of the passenger effectively, as well as the head and shoulder regions, the back rest is divided into a side part and a center part. The side part is attached to the vehicle side wall and contains the gas cushion which is inflatable by a gas generator.

10 Claims, 1 Drawing Sheet

SIDE MOUNTED AIRBAG DEVICE

BACKGROUND OF THE INVENTION

This invention concerns safety arrangements for vehicles having a cushion inflatable by a gas generator.

As a result of increasing safety requirements, greater attention has recently been given to the occurrence of vehicle accidents involving side collisions. In collisions involving the side of a vehicle, the distance between the point of collision and a passenger to be protected is very small, so that a device for protecting passengers in such collisions must be highly effective. In this connection, air bag arrangements which are mounted in the vicinity of the side of a vehicle, either in the vehicle structure itself or else in a seat accommodating vehicle passengers, have received particular attention. In German Offenlegungsschift Nos. 42 04 280 and 42 10 562, and in the prior art mentioned therein, air bag arrangements are described which are not limited to any particular type of seat, and thus may be equally useful in front seats and back seats. These prior art references, however, do not disclose any application of the arrangements therein to the back seat of a vehicle.

The problems relating to the protection of passengers in the rear of a motor vehicle are discussed in detail in German Gebrauchsmuster Nos. 91 11 206 and 92 02 725. Those references disclose generic cushions for air bag devices which are arranged in the shoulder and head regions of back rests. Hence, these arrangements are capable of protecting only the upper part of the body. No protection is provided for the chest and hip regions of passengers sitting in the rear seat of a vehicle.

SUMMARY OF THE INVENTION

Accordingly, it is an object of the present invention to provide a safety arrangement for vehicles which overcomes the disadvantages of the prior art.

Another object of the invention is to provide a safety arrangement for vehicles in which the protection provided by conventional rear seat safety devices is extended below the head and shoulders of a passenger.

These and other objects of the invention are attained by providing a gas cushion in a rear seat part located between the side wall of a vehicle and the back rest for the rear seat of the vehicle.

Thus, according to the invention, the back part of a seat in the rear of a vehicle is separated from a side wall of the vehicle so that a side part arranged for accommodation of a gas cushion is attached to a side wall of the vehicle and is capable of being connected to a part of the vehicle arranged to support the center part of the back seat. The center part preferably is designed as a folding back rest which is lockable in the raised position by a conventional back rest locking mechanism on the vehicle structure. This two-piece arrangement of the back rest permits inflation of the gas cushion out of the region at the side of the back rest without requiring special tear lines or predetermined breaking points in the seat cover. In addition, this two-piece arrangement ensures that the gas cushion will remain stationary when, for example, the back rest has to be folded down to enlarge the cargo space. This avoids damage to the gas cushion and to the associated control lines, as well as preventing accidental activation.

Also of particular importance is the fact that the side part of the back rest, together with a module containing the gas cushion and gas generator, may be a separate subassembly thus considerably facilitating assembly of the safety arrangement according to the invention into the vehicle.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
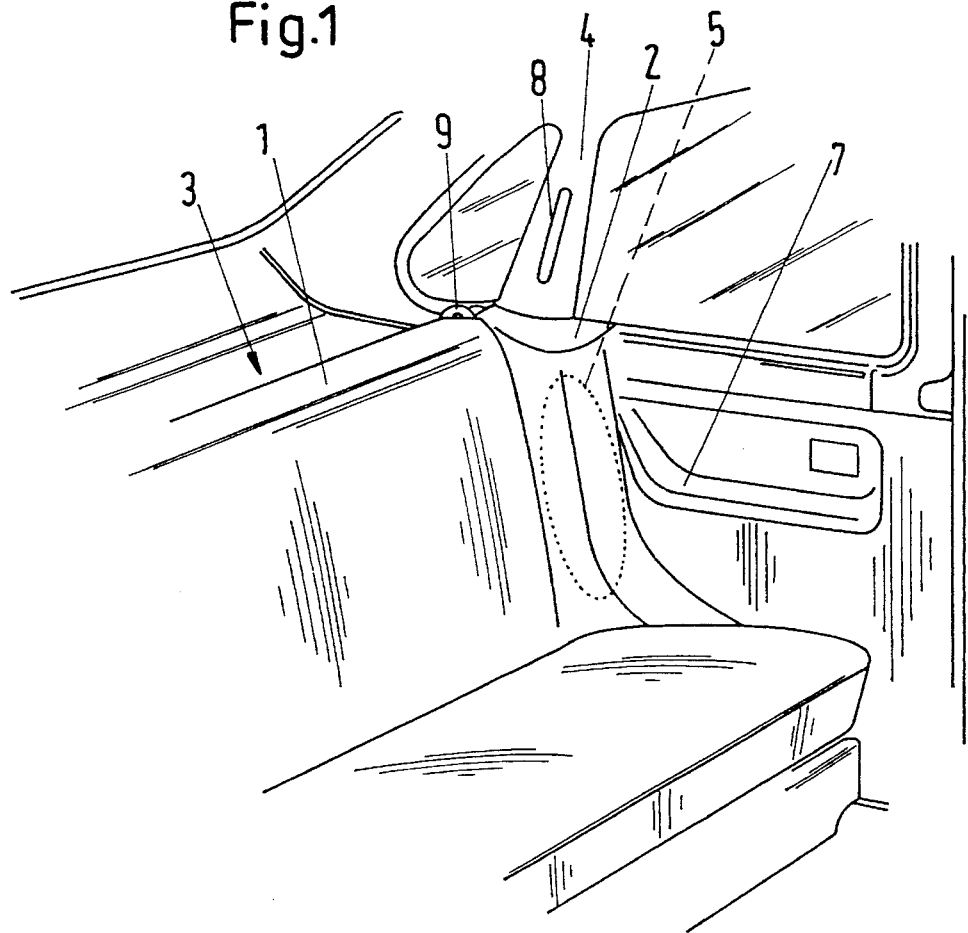
FIG. 1 is a schematic perspective view illustrating a safety arrangement mounted in the vicinity of the back seat of a vehicle according to the invention.
Figure 2:
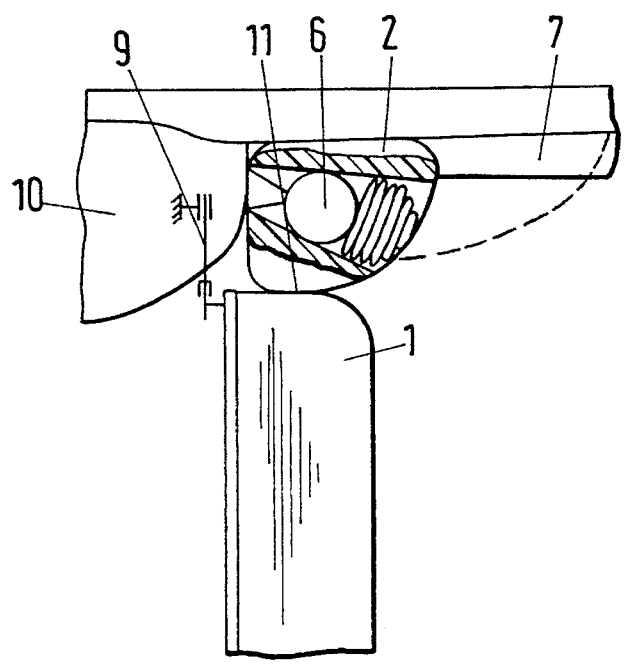
FIG. 2 is a top view of the safety arrangement showing the mounting for the back rest and the vehicle side wall.

In the typical embodiment of the invention shown in the drawings, the arrangement of a back seat 3 of a vehicle includes a center part 1 and a side part 2. The side part 2, which is mounted in the region of the vehicle C column 4, is a padded part, containing a gas cushion 5 which may consist of a plurality of separate cushion members connected to a single gas generator 6 (shown in FIG. 2), or alternatively, a plurality of gas generators positioned side by side. In a preferred arrangement, inflation of the gas cushion 5 projects the cushion forwardly toward the front of the vehicle in the region of an arm rest 7, as shown by the broken lines in FIG. 2, as well as upwardly to cover a belt-reversing fitting 8 arranged on the C column 4 shown in FIG. 1. The center part 1 of the back seat 3 is capable of swinging downwardly with respect to the side part 2 about pivot points (not shown) and is normally secured in the raised position to the side of the vehicle structure by a locking device 9 schematically shown in FIG. 2.

According to an especially advantageous embodiment of the invention, the gas cushion 5 and the gas generator 6 are combined into a module and attached, together with the side part 2, to a wheel housing 10. The wheel housing 10, which also accommodates the locking device 9, supports the safety arrangement consisting of the gas cushion 5 and the gas generator 6 in such a way that, upon actuation of the safety arrangement, it is able to introduce the supporting forces occurring in a collision especially effectively into the entire vehicle structure. Attachment of the safety device in the region of the wheel housing is also advantageous because, if the vehicle side wall is deformed, the wheel housing 10 itself is deformed relatively late as compared with the outer wall of the vehicle. In this way the inflated gas cushion 5 remains in the same protective position as long as possible in relation to the passenger accommodated in the seat 3 and is thus able to provide full protection.

It should also be noted that, with accommodation of the gas cushion 5 in the side part 2, there is no loss of passenger convenience. In the unactivated condition, the folded gas cushion 5 and the gas generator 6 are so small that they can easily be accommodated in seat padding to provide the side part 2, preferably having a padded surface which is an integral component of the gas cushion. Accordingly, the space available to passengers between the side walls of a vehicle is not reduced in order to accommodate the gas cushion module. Moreover, the transition from the center part 1 of the back seat 3 through the side part 2 to the side wall of the vehicle can be designed favorably from the standpoint of ergonomics, particularly when an arm-rest well is provided in the side wall. For protection of the side part 2, and hence the gas cushion module as well, it is advantageous to provide a line of separation 11 between the side part 2 and the center part 1 of the rear seat so that the side part 2 is set back toward the side wall of the vehicle in comparison to the maximum projection (transreverse extent) of the wheel housing 10. Consequently, when bulky objects are accommodated in a cargo space arranged behind the back seat 3, their movement will be limited so that impact with the side part 2 cannot occur.

Use of the safety arrangement according to the invention is not limited to back seats of vehicles having only two rows of seats. The safety arrangement according to the invention may also be provided in vehicles such as buses and the like having many rows of seats arranged behind one another.

Although the invention has been described herein with reference to specific embodiments, many modifications and variations therein will readily occur to those skilled in the art. Accordingly, all such variations and modifications are included within the intended scope of the invention.

We claim:

1. A safety arrangement for a vehicle having a back seat with a back rest comprising a side part for the back rest mounted in a side wall of the vehicle and a center part for the back rest which is separable from the side part, and a gas generator and at least one gas cushion inflatable by the gas generator for the protection of a passenger in the back seat contained in the side part.

2. A safety arrangement according to claim 1 wherein the gas cushion and the gas generator are combined into a module which is accommodated substantially entirely in the side part.

3. A safety arrangement according to claim 1 wherein the side part has a padded surface which is an integral component of the gas cushion.

4. A safety arrangement according to claim 1 wherein the center part, the side part and the side wall of the vehicle have a geometry adapted to ergonomic requirements.

5. A safety arrangement according to claim 1, including a wheel housing in the side wall of the vehicle adjacent to the side part providing support for the gas cushion when the safety arrangement is activated.

6. A safety arrangement according to claim 1, wherein the gas cushion is inflatable out of the side part toward the front of the vehicle.

7. A safety arrangement according to claim 1, wherein the gas cushion is inflatable upwardly out of the side part to a level corresponding to the head of a passenger.

8. A safety arrangement according to claim 7, wherein the gas cushion is inflatable out of the side part between a vehicle column and the location of the head of the passenger.

9. A safety arrangement according to claim 2, wherein the side part and the module are combined into a subassembly of the vehicle.

10. A safety arrangement according to claim 5, wherein the transverse extent of the wheel housing toward the interior of the vehicle is greater than the transverse extent of the side part of the back rest toward the interior of the vehicle.

* * * * *